US010440785B2

(12) United States Patent
Li et al.

(10) Patent No.: US 10,440,785 B2
(45) Date of Patent: Oct. 8, 2019

(54) CURRENT HOLDING CIRCUIT FOR BIDIRECTIONAL TRIODE THYRISTOR DIMMER AND LINEAR DIMMING DRIVING CIRCUIT USING THE SAME

(71) Applicant: ZHEJIANG YANKON MEGA LIGHTING CO., LTD., Shaoxing, Zhejiang (CN)

(72) Inventors: Yang Li, Zhejiang (CN); Lingxiang Zhong, Zhejiang (CN); Quanjiang Xu, Zhejiang (CN); Jingfei Lv, Zhejiang (CN)

(73) Assignee: ZHEJIANG YANKON MEGA LIGHTING CO., LTD., Shaoxing, Zhejiang (CN)

( * ) Notice: Subject to any disclaimer, the term of this patent is extended or adjusted under 35 U.S.C. 154(b) by 0 days.

(21) Appl. No.: 16/024,880

(22) Filed: Jul. 1, 2018

(65) Prior Publication Data
US 2019/0166663 A1    May 30, 2019

(30) Foreign Application Priority Data

Nov. 27, 2017  (CN) ............... 2017 1 1203084
Nov. 27, 2017  (CN) ............... 2017 2 1603755 U

(51) Int. Cl.
*H05B 37/00*       (2006.01)
*H05B 33/08*       (2006.01)

(52) U.S. Cl.
CPC ..... *H05B 33/0812* (2013.01); *H05B 33/0887* (2013.01)

(58) Field of Classification Search
CPC .... H05B 41/34; H05B 33/0803; H05B 39/09; H05B 41/28; H05B 33/0809;
(Continued)

(56) References Cited

U.S. PATENT DOCUMENTS

| 2011/0057564 A1* | 3/2011 | Otake | H05B 33/0815 |
| | | | 315/51 |
| 2013/0113375 A1* | 5/2013 | Leung | H05B 33/0815 |
| | | | 315/85 |

(Continued)

FOREIGN PATENT DOCUMENTS

CN           106332361 A     1/2017

*Primary Examiner* — Minh D A
(74) *Attorney, Agent, or Firm* — Yue (Robert) Xu; Apex Attorneys at Law, LLP

(57) ABSTRACT

A current holding circuit for a bidirectional triode thyristor (TRIAC) dimmer and a linear dimming driving circuit are provided. The current holding circuit for a TRIAC dimmer is a resistance and capacitance (RC) circuit including a first resistor and a first capacitor connected in series. The RC circuit is connected in parallel with any one of rectifying diodes of a rectifying bridge in the linear dimming driving circuit. The linear dimming driving circuit includes an overcurrent protecting circuit, a rectifying bridge including four rectifying diodes connected, the RC circuit, a surge suppressing circuit configured to absorb a high surge voltage of an input voltage, a filtering circuit, a linear constant-current circuit, and a flicker eliminating circuit configured to eliminate flicker caused by an asymmetrical current of a light emitting diode (LED) load due to the RC circuit.

4 Claims, 7 Drawing Sheets

(58) Field of Classification Search
CPC ............ H05B 41/2827; H05B 41/3927; H05B 41/2821; H05B 41/295; H05B 33/0815; H05B 33/0818; H05B 41/2828; H05B 41/3921

See application file for complete search history.

(56) References Cited

U.S. PATENT DOCUMENTS

| | | | |
|---|---|---|---|
| 2015/0359053 A1* | 12/2015 | van den Broeke | ........................ H05B 33/0815 315/200 R |
| 2017/0251532 A1* | 8/2017 | Wang | ................. H05B 33/0818 |

* cited by examiner

CURRENT HOLDING CIRCUIT FOR BIDIRECTIONAL TRIODE THYRISTOR DIMMER AND LINEAR DIMMING DRIVING CIRCUIT USING THE SAME

This application claims priority to Chinese Patent Application No. 201711203084.9, titled "CURRENT HOLDING CIRCUIT FOR BIDIRECTIONAL TRIODE THYRISTOR DIMMER AND LINEAR DIMMING DRIVING CIRCUIT USING THE SAME", and filed with the Chinese State Intellectual Property Office on Nov. 27, 2017, and Chinese Patent Application No. 201721603755.6, titled "CURRENT HOLDING CIRCUIT FOR BIDIRECTIONAL TRIODE THYRISTOR DIMMER AND LINEAR DIMMING DRIVING CIRCUIT USING THE SAME", and filed with the Chinese State Intellectual Property Office on Nov. 27, 2017, both of which are incorporated herein by reference in their entireties.

FIELD

The present disclosure relates to a linear power supply, and particularly to a current holding circuit for a bidirectional triode thyristor (TRIAC) dimmer and a linear dimming driving circuit.

BACKGROUND

In a traditional incandescent lamp, a TRIAC dimmer is generally used for dimming. Since a purely resistive filament is used in the incandescent lamp, when a current flows through the purely resistive filament, the purely resistive filament is conducted to emit light, and there is always a current flowing through the TRIAC dimmer. Therefore, it is unnecessary to supply an additional current to the TRIAC dimmer. As incandescent lamps are gradually replaced by light emitting diode (LED) lamps, the TRIAC dimmer is still retained. Since the LED is a non-resistive direct-current driven device, an LED driving power supply is required to output a direct current, so as to supply power to the LED and maintain drive the LED with a constant current. The existing LED driving power supply is usually classified into a switching power supply and a linear power supply. The switching power supply includes an energy storage element, and thus can directly supply a holding current to the TRIAC dimmer, but the switching power supply is expensive. The linear power supply is gradually used to drive the LED by virtue of low price and a simple circuit thereof. However, only in a case where an input voltage is greater than an output voltage in the linear power supply, a current may flow through an LED load, so as to turn on the TRIAC dimmer. In a case where the input voltage is lower than the output voltage, no current flows through the LED load, so as to turn off the TRIAC dimmer, resulting in flashing of the LED lamp during dimming. Therefore, a current holding circuit for the TRIAC dimmer is required in the linear power supply.

A non-flicker LED filament lamp in the conventional technology includes a linear constant-current driving power supply and an LED illuminator. The driving power supply includes an overcurrent protecting unit, a rectifying and filtering unit, a linear constant-current unit, a constant-current filtering unit and a flicker eliminating unit. The flicker eliminating unit is used for converting an output current of the constant-current filtering unit into a direct current having no current ripple. An input terminal of the overcurrent protecting unit is connected to commercial alternating-current power, an output terminal of the overcurrent protecting unit is connected to an input terminal of the rectifying and filtering unit, an output terminal of the rectifying and filtering unit is connected to an input terminal of the linear constant-current unit, an output terminal of the linear constant-current unit is connected to an input terminal of the constant-current filtering unit, an output terminal of the constant-current filtering unit is connected to an input terminal of the flicker eliminating unit, and an output terminal of the flicker eliminating unit is connected to the LED illuminator. The non-flicker LED filament lamp further includes a dimmer. A dimmer holding current supplying unit connected to the dimmer is connected between the output terminal of the rectifying and filtering unit and the input terminal of the linear constant-current unit. The driving power supply of the non-flicker LED filament lamp is a linear power supply. The driving power supply includes the dimmer holding current supplying unit, which may supply two parts of current to the dimmer. The dimmer holding current supplying unit has a complicated circuit, a great number of elements, high price and large circuit loss, resulting in low efficiency of the driving power supply.

SUMMARY

In order to solve the technical problems in the present disclosure, a current holding circuit for a TRIAC dimmer and a linear dimming driving circuit using the current holding circuit for the TRIAC dimmer are provided. The current holding circuit for the TRIAC dimmer has a simple structure and low price, and does not consume any electric energy substantially, thereby greatly improving efficiency of the linear dimming drive circuit using the current holding circuit for the TRIAC dimmer.

A technical solution in the present disclosure for solving the above technical problem is a current holding circuit for a TRIAC dimmer, which is a resistance and capacitance (RC) circuit including a first resistor and a first capacitor connected in series. The RC circuit is connected in parallel with any one of rectifying diodes of a rectifying bridge in a linear dimming driving circuit.

A linear dimming driving circuit described above is provided, which includes: an overcurrent protecting circuit; a rectifying bridge including four rectifying diodes connected; a current holding circuit for a TRIAC dimmer which is a RC circuit; a surge suppressing circuit configured to absorb a high surge voltage of an input voltage; a filtering circuit configured to reduce or filter out flicker caused by an asymmetrical current of an LED load due to the RC circuit; a linear constant-current circuit; and a flicker eliminating circuit configured to eliminate the flicker caused by the asymmetrical current of the LED load due to the RC circuit. An input terminal of the overcurrent protecting circuit is connected to commercial low-frequency alternating-current power, and an output terminal of the overcurrent protecting circuit is connected to an input terminal of the rectifying bridge. The RC circuit includes a first resistor and a first capacitor connected in series, and is connected in parallel with any one of the rectifying diodes. An output terminal of the rectifying bridge is connected to an input terminal of the surge suppressing circuit. An output terminal of the surge suppressing circuit is connected to an input terminal of the filtering circuit. An output terminal of the filtering circuit is connected to an input terminal of the linear constant-current circuit. An output terminal of the linear constant-current circuit is connected to an earth terminal of the rectifying bridge and the surge suppressing circuit. The linear constant-current circuit is connected to an output terminal of the flicker eliminating circuit. The LED load is connected between the input terminal of the filtering circuit and an input terminal of the flicker eliminating circuit.

The flicker eliminating circuit has a discrete component structure and includes a metal oxide semiconductor (MOS) transistor, a first voltage regulating diode and a second capacitor. A gate of the MOS transistor is connected to an anode of the first voltage regulating diode and one terminal of the second capacitor. A source of the MOS transistor is connected to the other terminal of the second capacitor, and a common connection terminal through which the source of the MOS transistor is connected to the other terminal of the second capacitor is connected to the linear constant-current circuit. A drain of the MOS transistor is connected to a cathode of the first voltage regulating diode, and a common connection terminal through which the drain of the MOS transistor is connected to the cathode of the first voltage regulating diode is connected to a cathode of the LED load.

A sub-circuit configured to reduce a current ripple is provided between the gate of the MOS transistor and the anode of the first voltage regulating diode. The sub-circuit includes a second resistor and a second voltage regulating diode connected in parallel. A common connection terminal through which a terminal of the second resistor is connected to a cathode of the second voltage regulating diode is connected to the gate of the MOS transistor. A common connection terminal through which the other terminal of the second resistor is connected to an anode of the second voltage regulating diode is connected to the anode of the first voltage regulating diode. Here, the sub-circuit including the second resistor and the second voltage regulating diode connected in parallel is added between the gate of the MOS transistor and the anode of the first voltage regulating diode, to obtain a current with a small ripple.

The flicker eliminating circuit has a chip structure, and includes a flicker eliminating chip and a third capacitor. A pin of the flicker eliminating chip is connected to a terminal of the third capacitor. Another pin of the flicker eliminating chip is connected to the other terminal of the third capacitor, and a common connection terminal through which the another pin of the flicker eliminating chip is connected to the other terminal of the third capacitor is connected to the linear constant-current circuit. Yet another pin of the flicker eliminating chip is connected to a cathode of the LED load.

As compared with the conventional technology, the present disclosure has the following advantages.

In the current holding circuit for the TRIAC dimmer, since the first capacitor is a reactive power loss element, and a resistance value of the first resistor is small, the current holding circuit for the TRIAC dimmer has small energy loss, thereby improving efficiency of the linear dimming driving circuit using the current holding circuit for the TRIAC dimmer. In addition, since the first capacitor is provided, an input voltage can be added with a voltage of the first capacitor in a case where the input voltage is lower than an output voltage, the added voltage is outputted to the LED load, thereby broadening dimming depth. In addition, the current holding circuit for the TRIAC dimmer only includes the first resistor and the first capacitor, thereby having a simple structure and low price.

The current holding circuit for the TRIAC dimmer used in the linear dimming driving circuit is the RC circuit with little energy loss, thereby not only improving efficiency but also broadening dimming depth, however, resulting in a low frequency and an increase in flicker since waveforms of currents flowing through the LED load in a positive half cycle and a negative half cycle are different from each other. In addition, since the RC circuit is directly connected in parallel between an input terminal and an output terminal of the rectifying bridge, when a high surge voltage is inputted, the high surge voltage can be directly outputted to the linear dimming driving circuit through the RC circuit, which easily damages the LED load and the linear constant-current circuit. Therefore, a surge suppressing circuit and a flicker eliminating circuit are added in the linear dimming driving circuit, to solve the above problem, such that the linear dimming driving circuit is high efficient and has no flicker, and the efficiency of the linear dimming driving circuit is increased by more than 10% as compared with the existing linear power supply.

DETAILED DESCRIPTION

The embodiments of the present disclosure are further described below in detail with reference to the drawings.
First Embodiment A current holding circuit for a TRIAC dimmer is provided in the embodiment. As shown in FIG. 1a to FIG. 1d, the current holding circuit for the TRIAC dimmer is an RC circuit 1 including a first resistor R1 and a first capacitor C1 connected in series. The RC circuit 1 is connected in parallel with any one of rectifying diodes of a rectifying bridge in a linear dimming driving circuit. Since the first capacitor C1 is a reactive power loss element and a resistance value of the first resistor R1 is small, the current holding circuit for the TRIAC dimmer has small energy loss, such that the linear dimming driving circuit using the current holding circuit for the TRIAC dimmer is high efficient. In addition, since the first capacitor C1 is provided, an input voltage may be added with a voltage of the first capacitor C1 in a case where the input voltage is lower than an output voltage, the added voltage is outputted to an LED load, thereby broadening dimming depth.

Figure 1A:
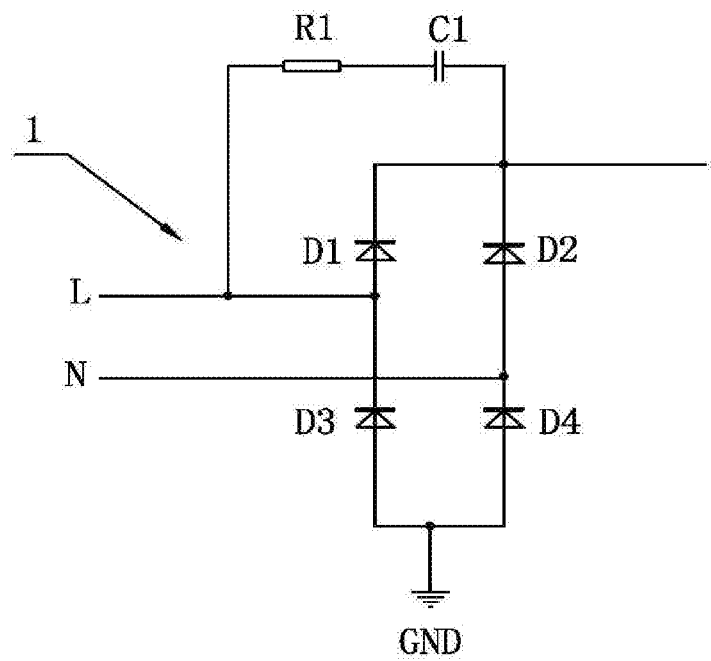
FIG. 1a shows a first connection mode of an RC circuit and a rectifying bridge.
Figure 1B:
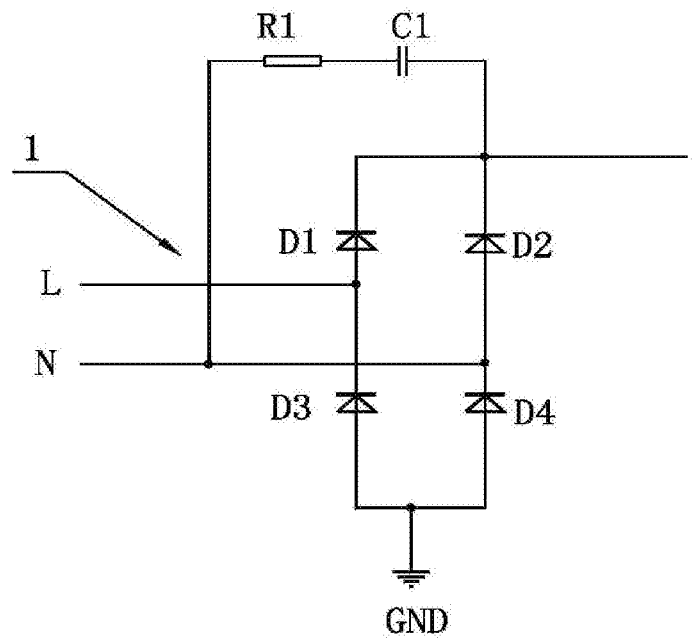
FIG. 1b shows a second connection mode of an RC circuit and a rectifying bridge.
Figure 1C:
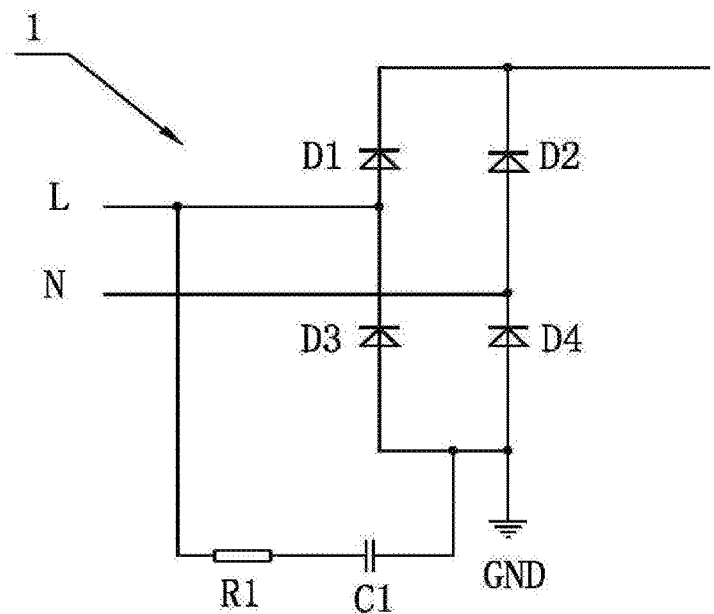
FIG. 1c shows a third connection mode of an RC circuit and a rectifying bridge.
Figure 1D:
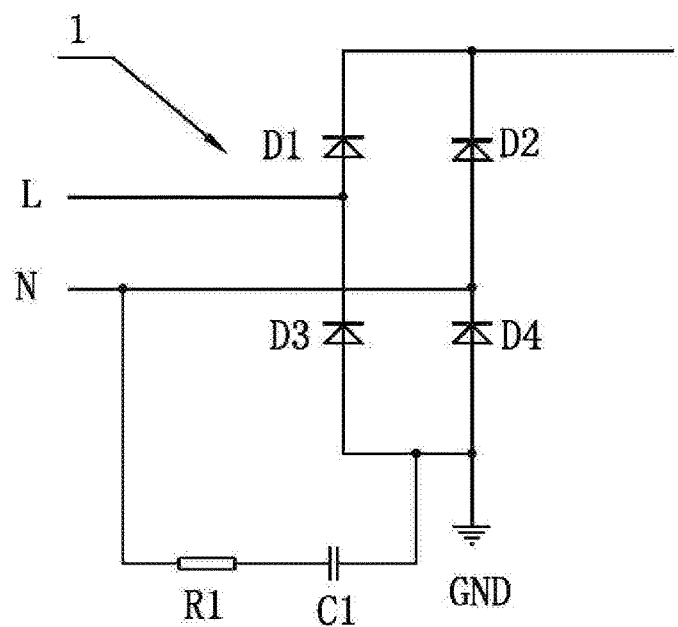
FIG. 1d shows a fourth connection mode of an RC circuit and a rectifying bridge.

Since the rectifying bridge includes four rectifying diodes D1, D2, D3 and D4 connected, the RC circuit 1 has four connection modes. In the rectifying bridge, an anode of the first rectifying diode D1 is connected to a cathode of the third rectifying diode D3, and a common connection terminal through which the anode of the first rectifying diode D1 is connected to the cathode of the third rectifying diode D3 is connected to a live wire L. A cathode of the first rectifying diode D1 is connected to a cathode of the second rectifying diode D2, and a common connection terminal through which the cathode of the first rectifying diode D1 is connected to the cathode of the second rectifying diode D2 is an output terminal of the rectifying bridge. An anode of the second rectifying diode D2 is connected to a cathode of the fourth rectifying diode D4, and a common connection terminal through which the anode of the second rectifying diode D2 is connected to the cathode of the fourth rectifying diode D4 is connected to a neutral wire N. An anode of the third rectifying diode D3 is connected to an anode of the fourth rectifying diode D4, and a common connection terminal through which the anode of the third rectifying diode D3 is connected to the anode of the fourth rectifying diode D4 is an earth terminal of the rectifying bridge. In the first connection mode, as shown in FIG. 1a, a terminal of the RC circuit 1 is connected to a common connection terminal through which the anode of the first rectifying diode D1 is connected to the live wire L, the other terminal of the RC circuit 1 is connected to the cathode of the first rectifying diode D1. In the second connection mode, as shown in FIG. 1b, a terminal of the RC circuit 1 is connected to a common connection terminal through which the anode of the second rectifying diode D2 is connected to the neutral wire N, and the other terminal of the RC circuit 1 is connected to the cathode of the second rectifying diode D2. In the third connection mode, as shown in FIG. 1c, a terminal of the RC circuit 1 is connected to a common connection terminal through which the cathode of the third rectifying diode D3 is connected to the live wire L, and the other terminal of the RC circuit 1 is connected to the anode of the third rectifying diode D3. In the fourth connection mode, as shown in FIG. 1d, a terminal of the RC circuit 1 is connected to a common connection terminal through which the cathode of the fourth rectifying diode D4 is connected to the neutral wire N, and the other terminal of the RC circuit 1 is connected to the anode of the fourth rectifying diode D4.

An operating principle of the RC circuit is described with taking the first connection mode as an example. In a negative half cycle (a potential at the neutral wire N is greater than a potential at the live wire L) of an input voltage, the input voltage is applied to a loop from the neutral wire N to the live wire L through the second rectifying diode D2 and the RC circuit 1, to charge the first capacitor C1 in the RC circuit 1. A charging current of the first capacitor C1 provides a holding current for a TRIAC dimmer. In a positive half cycle (a potential at the live wire L is greater than a potential at the neutral wire N) of the input voltage, the input voltage is added with a voltage of the first capacitor C1, and the added voltage is applied to a loop from the live wire L to the neutral wire N through the linear dimming driving circuit. In this case, an input current and a discharging current of the first capacitor C1 jointly provides a holding current for the TRIAC dimmer. In this way, a current always flows through the TRIAC dimmer whether in the positive half cycle or the negative half cycle of the input voltage. Operating principles in the second connection mode, the third connection mode and the fourth connection mode are the same as the operating principle in the first connection mode.

Second Embodiment

Figure 2:
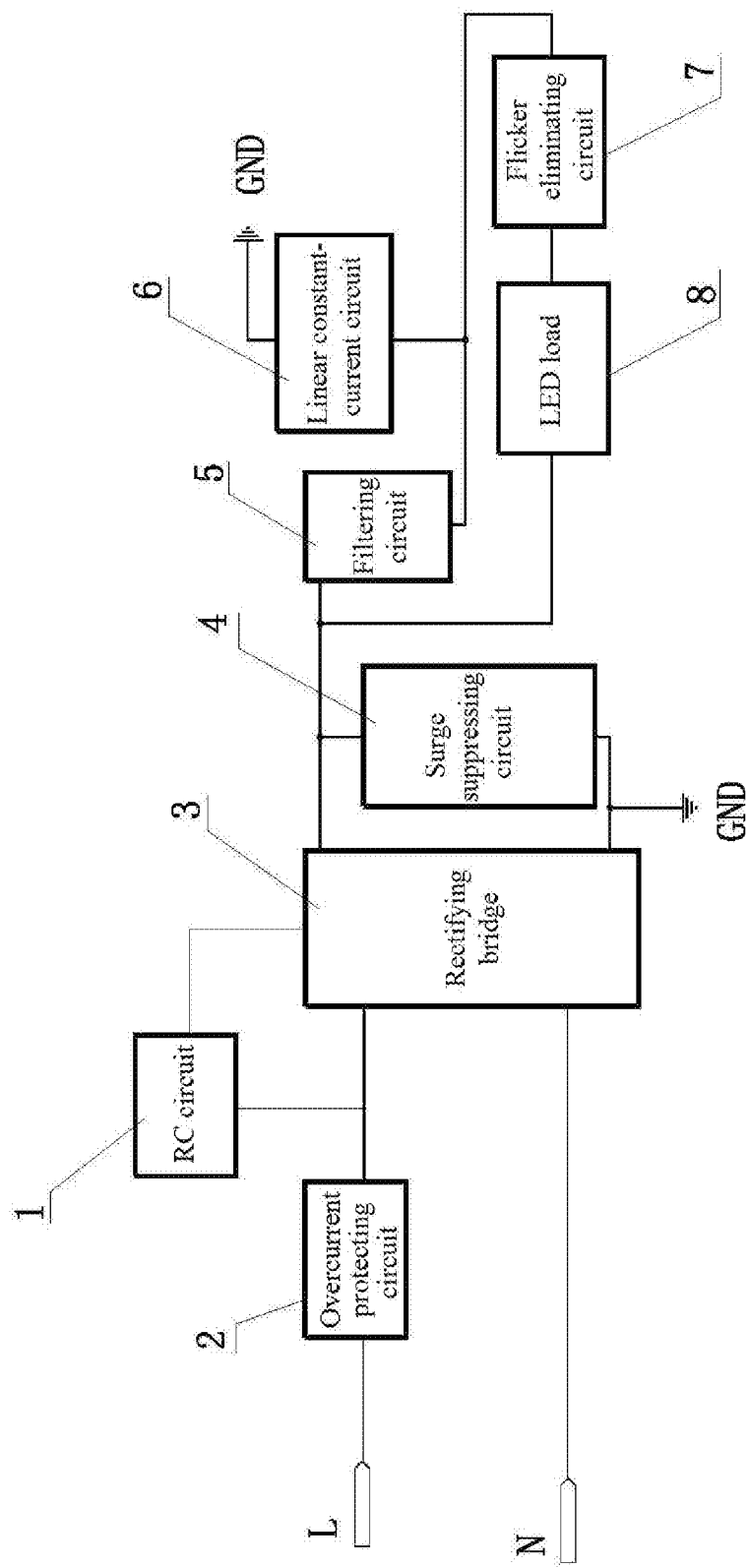
FIG. 2 is a schematic structural diagram of a linear dimming driving circuit.

A linear dimming driving circuit using the current holding circuit for the TRIAC dimmer according to the first embodiment is provided in this embodiment. As shown in FIG. 2, the linear dimming driving circuit includes: an overcurrent protecting circuit 2; a rectifying bridge 3 including four rectifying diodes D1, D2, D3 and D4 connected; the RC circuit 1; a surge suppressing circuit 4 configured to absorb a high surge voltage of an input voltage; a filtering circuit 5 configured to reduce or filter out flicker caused by an asymmetrical current of an LED load due to the RC circuit 1; a linear constant-current circuit 6; and a flicker eliminating circuit 7 configured to eliminate the flicker caused by the asymmetrical current of the LED load due to the RC circuit 1. An input terminal of the overcurrent protecting circuit 2 is connected to commercial low-frequency alternating-current power, and an output terminal of the overcurrent protecting circuit 2 is connected to an input terminal of the rectifying bridge 3. The RC circuit 1 is connected in parallel with any one of the rectifying diodes. An output terminal of the rectifying bridge 3 is connected to an input terminal of the surge suppressing circuit 4, and an output terminal of the surge suppressing circuit 4 is connected to an input terminal of the filtering circuit 5. An output terminal of the filtering circuit 5 is connected to an input terminal of the linear constant-current circuit 6, and an output terminal of the linear constant-current circuit 6 is connected to an earth terminal of the rectifying bridge 3 and the surge suppressing circuit 4. The linear constant-current circuit 6 is connected to an output terminal of the flicker eliminating circuit 7. The LED load 8 is connected between an input terminal of the filtering circuit 5 and an input terminal of the flicker eliminating circuit 7. Since the first capacitor C1 is provided in the RC circuit 1, an input voltage may be added with a voltage of the first capacitor C1 in a case where the input voltage is lower than an output voltage, the added voltage is outputted to the LED load 8, thereby broadening dimming depth, however, resulting in a low frequency and an increase in flicker since waveforms of the current flowing through the LED load 8 in a positive half cycle and a negative half cycle are different from each other. In addition, since the RC circuit 1 is directly connected in parallel between the input terminal and the output terminal of the rectifying bridge 3, when a high surge voltage is inputted, the high surge voltage may be directly outputted to the linear dimming driving circuit through the RC circuit 1, which easily damages the LED load 8 and the linear constant-current circuit 6. Therefore, the surge suppressing circuit 4 and the flicker eliminating circuit 7 are added in the linear dimming driving circuit to solve the above problem.

Figure 3:
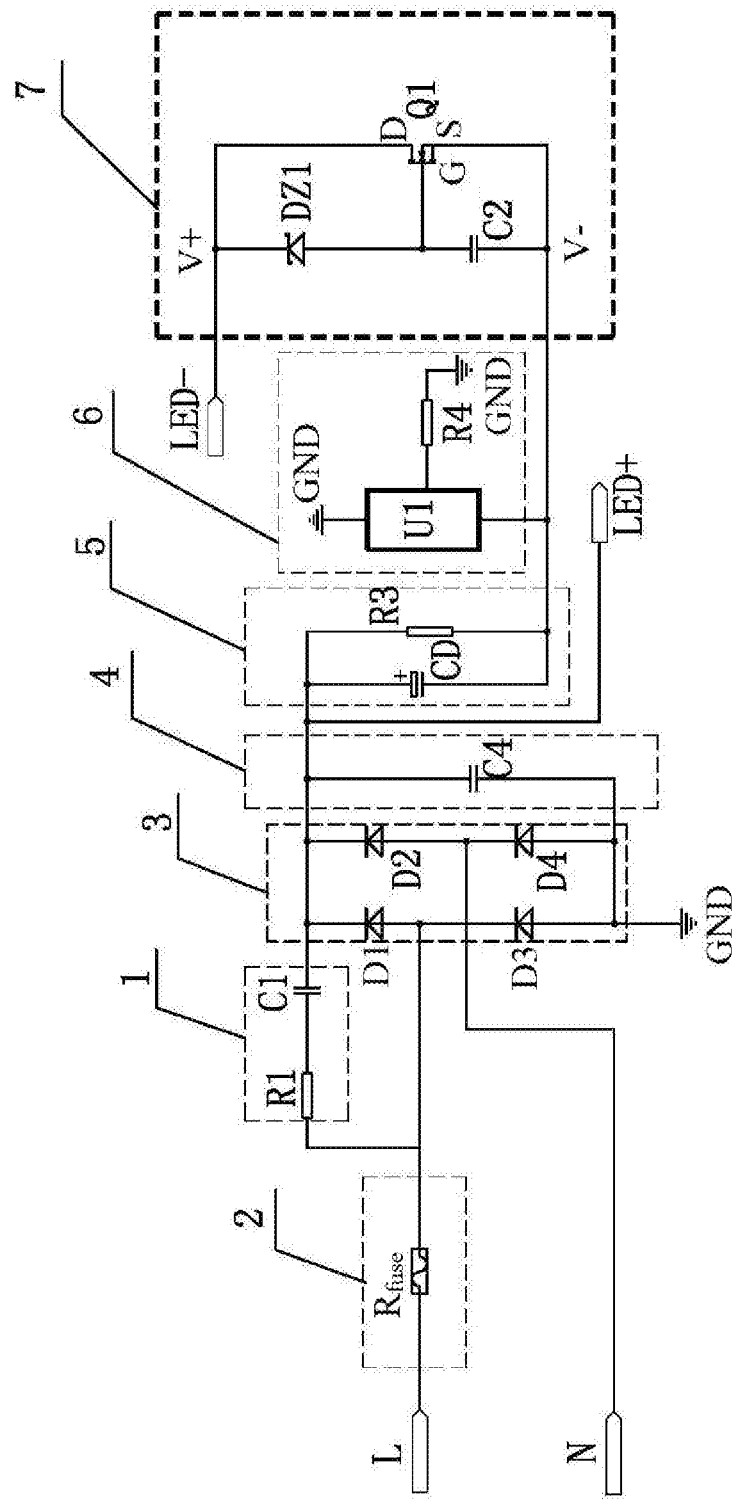
FIG. 3 is a circuit diagram of a linear dimming driving circuit in a case where the RC circuit is connected in the first connection mode.

FIG. 3 is a circuit diagram of a linear dimming driving circuit in a case where the RC circuit is connected in the first connection mode. The overcurrent protecting circuit 2 includes a fuse resistor $R_{fuse}$. The surge suppressing circuit 4 includes a fourth capacitor C4. The filtering circuit 5 includes an electrolytic capacitor CD and a third resistor R3. The linear constant-current circuit 6 includes a linear constant-current chip U1 and a fourth resistor R4. The linear constant-current chip U1 is provided according to the conventional technology. A terminal of the fuse resistor $R_{fuse}$ is connected to an input terminal of the live wire L, and the other terminal of the fuse resistor $R_{fuse}$ is connected to an anode of the first rectifying diode D1 and a cathode of the third rectifying diode D3. A cathode of the first rectifying diode D1 is connected to a cathode of the second rectifying diode D2, an anode of the second rectifying diode D2 is connected to a cathode of the fourth rectifying diode D4, and a common connection terminal through which the anode of the second rectifying diode D2 is connected to the cathode of the fourth rectifying diode D4 is connected to an input terminal of the neutral wire N. An anode of the third rectifying diode D3 is connected to an anode of the fourth rectifying diode D4, and a common connection terminal through which the anode of the third rectifying diode D3 is connected to the anode of the fourth rectifying diode D4 is earthed. A terminal of the RC circuit 1 is connected to a common connection terminal through which the anode of the first rectifying diode D1 is connected to the other terminal of the fuse resistor $R_{fuse}$, and the other terminal of the RC circuit 1 is connected to the cathode of the first rectifying diode D1. The fourth capacitor C4 is connected in parallel between a common connection terminal through which the cathode of the first rectifying diode D1 is connected to the cathode of the second rectifying diode D2 and a common connection terminal through which the anode of the third rectifying diode D3 and the anode of the fourth rectifying diode D4. Each of the fourth capacitor C4 and the common connection terminal through which the cathode of the first rectifying diode D1 is connected to the cathode of the second rectifying diode D2 is connected to an anode of the LED load 8 and an anode of the electrolytic capacitor CD. The third resistor R3 is connected in parallel between the anode and a cathode of the electrolytic capacitor CD. A common connection terminal through which the third resistor R3 is connected to the cathode of the electrolytic capacitor CD is connected to an input pin of the linear constant-current chip U1. A pin of the linear constant-current chip U1 is earthed, and yet another pin of the linear constant-current chip U1 is connected in series with the fourth resistor R4 and then is earthed. The input pin of the linear constant-current chip U1 is connected to the flicker eliminating circuit 7. Here, the surge suppressing circuit 4 is an ordinary high-voltage suppressing circuit including a capacitor. The surge suppressing circuit 4 may also be a high-voltage suppressing circuit including a capacitor and a surge suppressing device. In the filtering circuit 5, the third resistor R3 serves as a bleeder resistor. If a capacitance value of the electrolytic capacitor CD is large enough to filter out the flicker caused by the asymmetrical current of the LED load due to the RC circuit 1, the flicker eliminating circuit 7 may not be used. In the linear constant-current circuit 6, the fourth resistor R4 serves as a sampling resistor.

Figure 5A:
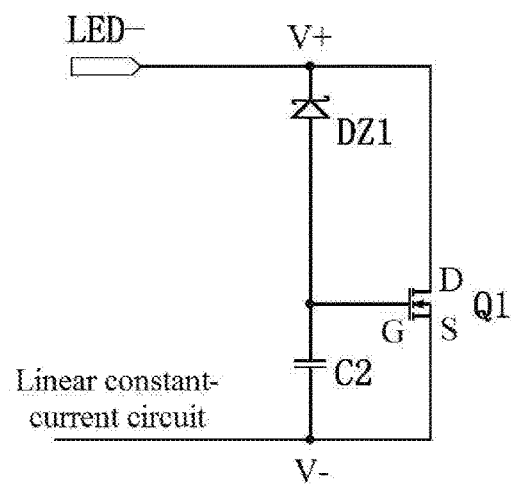
FIG. 5a shows a first structural circuit of a flicker eliminating circuit.
Figure 6:
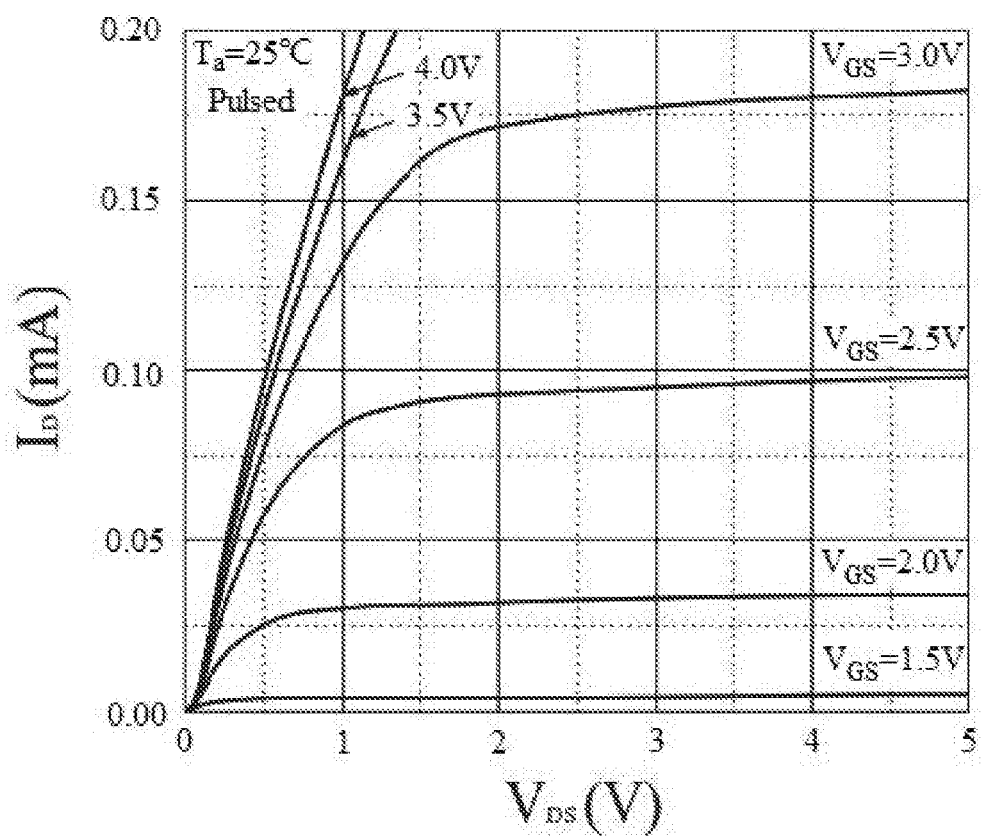
FIG. 6 is a graph of an MOS transistor in a saturation region in the flicker eliminating circuit with the first structural circuit.

In this embodiment, the flicker eliminating circuit 7 has a discrete component structure. As shown in FIG. 3 and FIG. 5a, the flicker eliminating circuit 7 includes an MOS transistor Q1, a first voltage regulating diode DZ1 and a second capacitor C2. A gate of the MOS transistor Q1 is connected to an anode of the first voltage regulating diode DZ1 and a terminal of the second capacitor C2. A source of the MOS transistor Q1 is connected to the other terminal of the second capacitor C2, and a common connection terminal through which the source of the MOS transistor Q1 is connected to the other terminal of the second capacitor C2 is connected to the input pin of the linear constant-current chip U1 in the linear constant-current circuit 6. A drain of the MOS transistor Q1 is connected to a cathode of the first voltage regulating diode DZ1, and a common connection terminal through which the drain of the MOS transistor Q1 is connected to the cathode of the first voltage regulating diode DZ1 is connected to a cathode of the LED load 8. In a case where a voltage $V_{GS}$ between the gate and the source of the MOS transistor Q1 meets $V_{GS} > V_{GS}(th)$ and a voltage $V_{DS}$ between the drain and the source of the MOS transistor Q1 meets $V_{DS} > V_{GS} - V_{GS}(th)$, the MOS transistor Q1 operates in a saturation region. $V_{GS}(th)$ denotes a turn-on voltage between the gate and the source of the MOS transistor Q1. FIG. 6 is a graph of the MOS transistor Q1 in a saturation region. In the saturation region, a current $I_D$ of the MOS transistor Q1 is only controlled by $V_{GS}$, and is independent of the $V_{DS}$. That is, the current $I_D$ of the MOS transistor Q1 is only controlled by a voltage between two terminals of the second capacitor C2. In a case where the input voltage is higher than a predetermined threshold of the first voltage regulating diode DZ1, the first voltage regulating diode DZ1 is broken down, and the input voltage wave is filtered by the second capacitor C2 to obtain a stable control voltage $V_{GS}$, and the stable control voltage $V_{GS}$ is outputted to the MOS transistor Q1, to turn on the MOS transistor Q1 and obtain a stable current.

Figure 4:
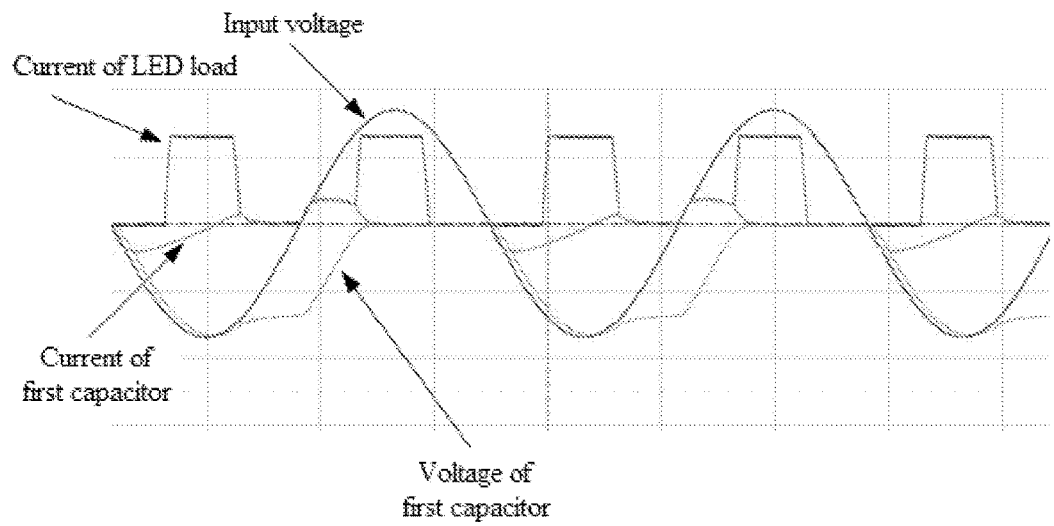
FIG. 4 is a voltage-current curve of a linear dimming driving circuit in a case where the RC circuit is connected in the first connection mode.

FIG. 4 shows a voltage-current curve of the linear dimming driving circuit in a case where the RC circuit is connected in the first connection mode. In a negative half cycle (a potential at the neutral wire N is greater than a potential at the live wire L) of an input voltage, the input voltage is applied to a loop from the neutral wire N to the live wire L through the second rectifying diode D2 and the RC circuit 1, to charge the first capacitor C1 in the RC circuit 1. A charging current of the first capacitor C1 provides a holding current for a TRIAC dimmer. In a positive half cycle (a potential at the live wire L is greater than a potential at the neutral wire N) of the input voltage, the input voltage is added with a voltage across the first capacitor C1, and the added voltage is applied to a loop from the live wire L to the neutral wire N through the linear dimming driving circuit. In this case, an input current and a discharging current of the first capacitor C1 jointly provide a holding current for the TRIAC dimmer. In this way, a current always flows through the TRIAC dimmer whether in the positive half cycle or the negative half cycle of the input voltage.

Third Embodiment

Figure 5B:
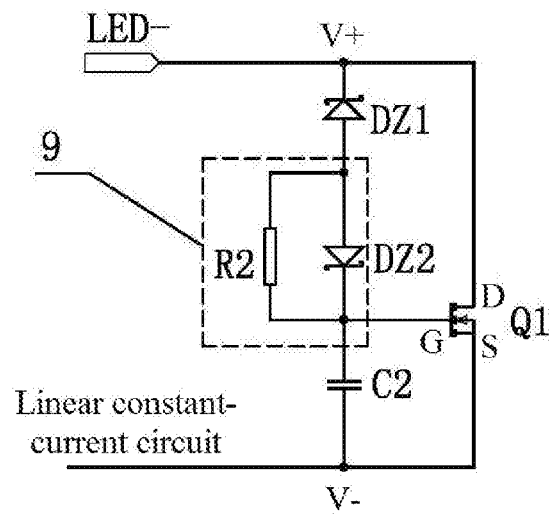
FIG. 5b shows a second structural circuit of the flicker eliminating circuit.

A linear dimming driving circuit is provided in this embodiment, in which, the flicker eliminating circuit is further improved based on the linear dimming driving circuit in the second embodiment. As shown in FIG. 5b, a sub-circuit 9 capable of reducing a current ripple is provided between the gate the MOS transistor Q1 and the anode of the first voltage regulating diode DZ1. The sub-circuit 9 includes a second resistor R2 and a second voltage regulating diode DZ2 connected in parallel. A common connection terminal through which a terminal of the second resistor R2 is connected to a cathode of the second voltage regulating diode DZ2 is connected to the gate of the MOS transistor Q1, and a common connection terminal through which the other terminal of the second resistor R2 is connected to an anode of the second voltage regulating diode DZ2 is connected to the anode of the first voltage regulating diode DZ1. In this embodiment, the sub-circuit 9 including the second resistor R2 and the second voltage regulating diode DZ2 connected in parallel is added between the gate of the MOS transistor Q1 and the anode of the first voltage regulating diode DZ1, to obtain a current with a small ripple.

Fourth Embodiment

Figure 5C:
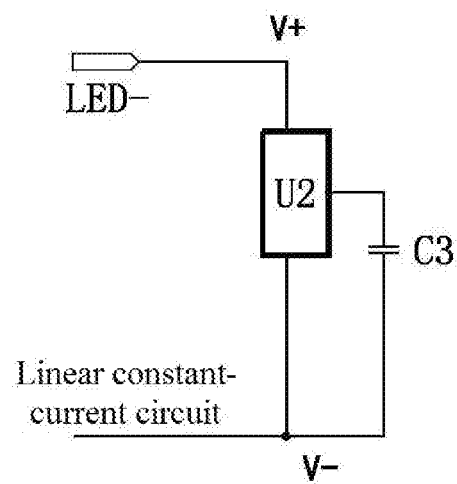
FIG. 5c shows a third structural circuit of the flicker eliminating circuit.

A linear dimming driving circuit is provided in this embodiment. The linear dimming driving circuit in this embodiment has the same structure as the linear dimming driving circuit in the second embodiment, except for the structure of the flicker eliminating circuit. The flicker eliminating circuit in this embodiment has a chip structure. As shown in FIG. 5c, the flicker eliminating circuit includes a flicker eliminating chip U2 and a third capacitor C3. A pin of the flicker eliminating chip U2 is connected to a terminal of the third capacitor C3, and another pin of the flicker eliminating chip U2 is connected to the other terminal of the third capacitor C3. A common connection terminal through which the another pin of the flicker eliminating chip U2 is connected to the other terminal of the third capacitor C3 is connected to the linear constant-current circuit 6. Yet another pin of the flicker eliminating chip U2 is connected to the cathode of the LED load 8. In this embodiment, an operating principle of the flicker eliminating chip U2 is similar to that of the flicker eliminating circuit in the discrete component structure.

The invention claimed is:

1. A linear dimming driving circuit, comprising:
   an overcurrent protecting circuit;
   a rectifying bridge comprising four rectifying diodes connected;
   a current holding circuit for a bidirectional triode thyristor (TRIAC) dimmer which is a resistance and capacitance (RC) circuit;
   a surge suppressing circuit configured to absorb a high surge voltage of an input voltage;
   a filtering circuit configured to reduce or filter out flicker caused by an asymmetrical current of a light emitting diode (LED) load due to the RC circuit;
   a linear constant-current circuit; and
   a flicker eliminating circuit configured to eliminate the flicker caused by the asymmetrical current of the LED load due to the RC circuit,
   wherein an input terminal of the overcurrent protecting circuit is connected to commercial low-frequency alternating-current power, an output terminal of the overcurrent protecting circuit is connected to an input terminal of the rectifying bridge, the RC circuit comprises a first resistor and a first capacitor connected in series, and the RC circuit is connected in parallel with any one of the rectifying diodes, an output terminal of the rectifying bridge is connected to an input terminal of the surge suppressing circuit, an output terminal of the surge suppressing circuit is connected to an input terminal of the filtering circuit, an output terminal of the filtering circuit is connected to an input terminal of the linear constant-current circuit, an output terminal of the linear constant-current circuit is connected to an earth terminal of the rectifying bridge and the surge suppressing circuit, the linear constant-current circuit is connected to an output terminal of the flicker eliminating circuit, and the LED load is connected between the input terminal of the filtering circuit and an input terminal of the flicker eliminating circuit.

2. The linear dimming driving circuit according to claim 1,
   wherein the flicker eliminating circuit has a discrete component structure and comprises a metal oxide semiconductor (MOS) transistor, a first voltage regulating diode and a second capacitor, and
   wherein a gate of the MOS transistor is connected to an anode of the first voltage regulating diode and a terminal of the second capacitor, a source of the MOS transistor is connected to the other terminal of the second capacitor, and a common connection terminal through which the source of the MOS transistor is connected to the other terminal of the second capacitor is connected to the linear constant-current circuit, and a drain of the MOS transistor is connected to a cathode of the first voltage regulating diode, and a common connection terminal through which the drain of the MOS transistor is connected to the cathode of the first voltage regulating diode is connected to a cathode of the LED load.

3. The linear dimming driving circuit according to claim 2,
   wherein a sub-circuit configured to reduce a current ripple is provided between the gate of the MOS transistor and the anode of the first voltage regulating diode, and the sub-circuit comprises a second resistor and a second voltage regulating diode connected in parallel, and
   wherein a common connection terminal through which a terminal of the second resistor is connected to a cathode of the second voltage regulating diode is connected to the gate of the MOS transistor, and a common connection terminal through which the other terminal of the second resistor is connected to an anode of the second voltage regulating diode is connected to the anode of the first voltage regulating diode.

4. The linear dimming driving circuit according to claim 1,
   wherein the flicker eliminating circuit has a chip structure and comprises a flicker eliminating chip and a third capacitor, and
   wherein a pin of the flicker eliminating chip is connected to a terminal of the third capacitor, another pin of the flicker eliminating chip is connected to the other terminal of the third capacitor, a common connection terminal through which the another pin of the flicker eliminating chip is connected to the other terminal of the third capacitor is connected to the linear constant-current circuit, and yet another pin of the flicker eliminating chip is connected to a cathode of the LED load.

* * * * *